United States Patent
Li et al.

(10) Patent No.: US 6,190,528 B1
(45) Date of Patent: Feb. 20, 2001

(54) HELICAL ELECTRODEIONIZATION APPARATUS

(76) Inventors: Xiang Li, Rm 302, Bldg 45, Ji Shan Er Cun, Huzhou, Zhejiang Province (CN); Gou-Lin Luo, Rm 704, Bldg 1, Ji Shan Nan Qu, Huzhou, Zhengjiang Province (CN)

(*) Notice: Under 35 U.S.C. 154(b), the term of this patent shall be extended for 0 days.

(21) Appl. No.: 09/266,995

(22) Filed: Mar. 12, 1999

(30) Foreign Application Priority Data

Mar. 19, 1998 (CN) .......................................... 98 2 23514.3
Nov. 17, 1998 (CN) .......................................... 98 2 25671.X

(51) Int. Cl.[7] .................................................... B01D 61/48

(52) U.S. Cl. ............................................ 204/632; 204/633

(58) Field of Search ................................... 204/632, 633

(56) References Cited

U.S. PATENT DOCUMENTS 5,292,422 * 3/1994 Liang et al. .......................... 204/632

* cited by examiner

*Primary Examiner*—Arun S. Phasge
(74) *Attorney, Agent, or Firm*—Quarles & Brady LLP

(57) ABSTRACT

A helical electrodeionization apparatus is adapted to purify aqueous liquids to effect the production of high purity water. An insulated net-separating wall is positioned between a pair of anion and cation exchange membranes to form a special membrane bag type flow unit I, each flow unit I is linked up with a group of slots on the side walls of central pipe, and is rolled up to form cylinder structure which centers on central pipe as the helical axis, a conductive crust is formed by winding metal strip or wire outside the cylinder. Ion exchange resin is filled up between the adjacent membrane bags to form flow unit II. The present invention has less pressure drop and needs less power, and is suited to multiple-device series operation. Preferably, daily maintenance and renewal of the resin is convenient, and production cost is lower.

5 Claims, 4 Drawing Sheets

HELICAL ELECTRODEIONIZATION APPARATUS

FIELD OF THE INVENTION

This invention relates to novel electrodeionization apparatus adapted to transfer ions in a liquid under the influence of an electrical field. More specifically, this invention relates to a helical eletrodeionization apparatus adapted to purify aqueous liquids to effect the production of high purity water.

BACKGROUND OF THE INVENTION

Many techniques have been used to purify and isolate liquids or to obtain concentrated pools of specific ions or molecules from a liquid mixture, such as electrodialysis, liquid chromatography, membrane filtration and ion exchange, etc. At present, a well known process is electrodeionization (EDI ). we also call it CDI (continuous deionization).

The first apparatus and method for treating liquids by electrodeionization was described by Kollsman in U.S. Pat. Nos. 2,689,826 and 2,815,320. Improved and advanced electrodeionization systems have been shown in U.S. Pat. Nos. 4,925,541, 4,931,160 and 5,316,637.

The typical structure of above-mentioned electrodeionization module is like a stacked mechanical sheet type, namely ion exchange membrane, separating wall and electrodes are processed to form a rectangle, and packed in sequence, ion exchange resin is filled up, and then is pressed to form a whole with mechanical method. It is difficult to maintain and clean the apparatus, especially one has to take apart the assembly to fill or renew the ion exchange resin. In general it needs special resin like fibre shape resin; moreover the water gathering structure of depletion compartment is more complex to process and it is easy to bring about leaking in inner part of concentration compartments and depletion compartments.

OBJECTS OF THE INVENTION

The present invention provides a helical electrodeionization apparatus for producing highly purified water. It is a technical improvement to the above-mentioned stacked mechanical sheet type.

In one aspect, the present invention has a simple structure. It is easy to process.

In another aspect, the present invention has no special requirement for ion exchange resin. It is convenient to renew and supplement.

In yet another aspect, the present invention allows solution stream to flow smoothly when it is used. It has less of pressure drop and no leaking in operation.

SUMMARY OF THE INVENTION

This present invention provides an apparatus for producing highly purified water. The technical scheme to realize the present invention is the following:

The apparatus includes anion exchange membrane and cation exchange membrane, central pipe, main component parts, outer crust and cover.

The central pipe is a metal pipe to act as an electrode and also as water distributing and gathering pipe or water gathering pipe.

The main component parts of said apparatus which has a helical cylinder structure, with the central pipe as the helical axis. One or more than one set(s) of rolled membrane bag(s) that are formed by positioning a net-separating wall between a pair cf anion exchange membrane and cation exchange membrane is rolled up to form the cylinder structure; then twine metal strip or metal wire is wound the outside of so that the cylinder structure to constitute a conductive crust, said conductive crust can be used as another electrode.

The membrane bag(s) fits tightly to the central pipe along the axial direction so that the flow passage is communicating with the central pipe through the slotted aperture(s). Fill the ion exchange resin between the adjacent membrane bag (s) to form the flow passage for getting product water.

The structure of the present invention is more simpler, and it is suited to multiple-device series operation. Besides, daily maintenance and renewal of the resin is also more convenient than prior art.

These and other features, aspects, and advantages of the present invention will be better understood from the following drawings, description and appended claims.

DETAILED DESCRIPTION OF THE PREFERRED EMBODIMENTS

Figure 1:
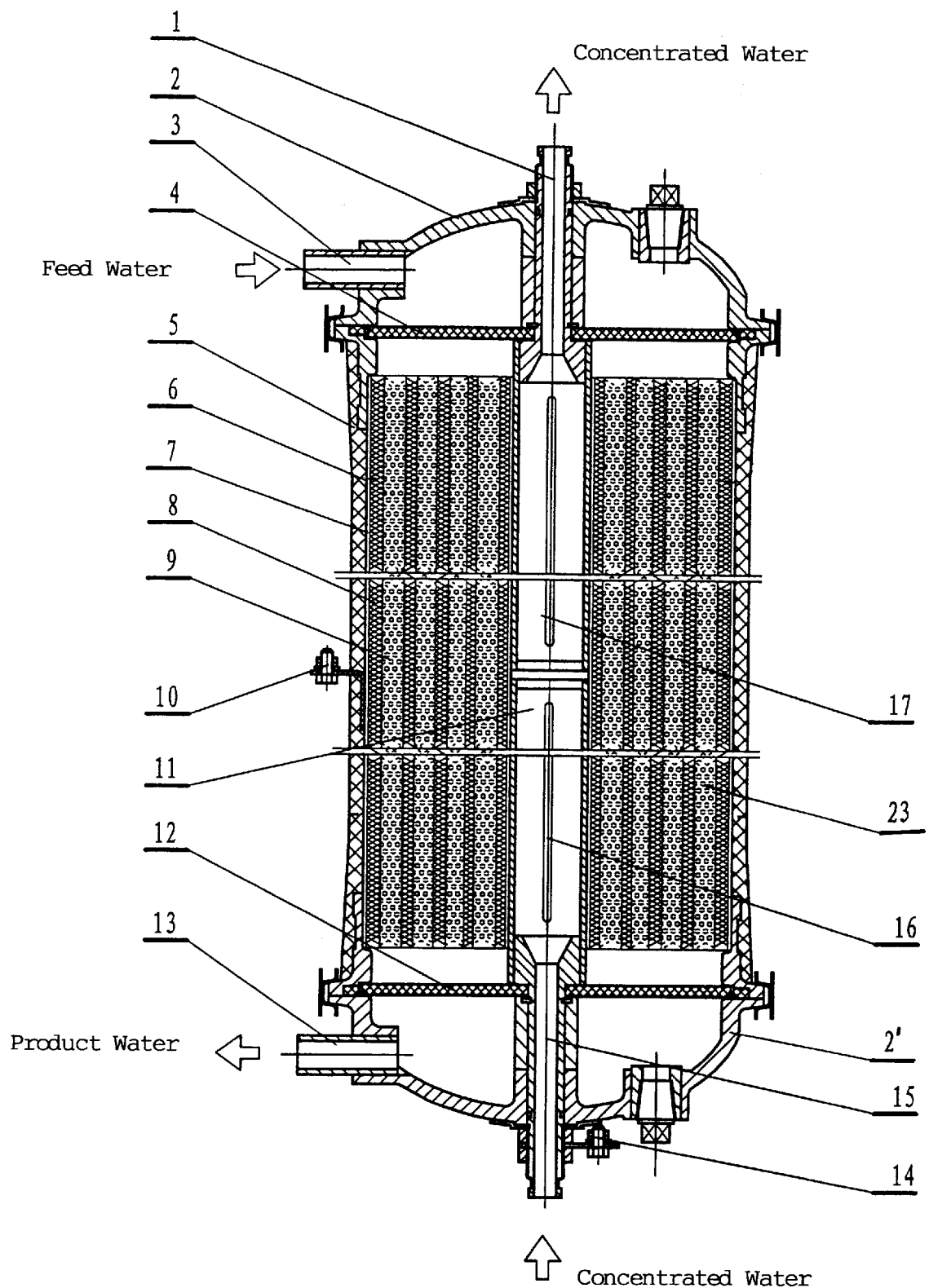
FIG. 1 is a sectional schematic view of the of general structure of the present invention.
Figure 2:
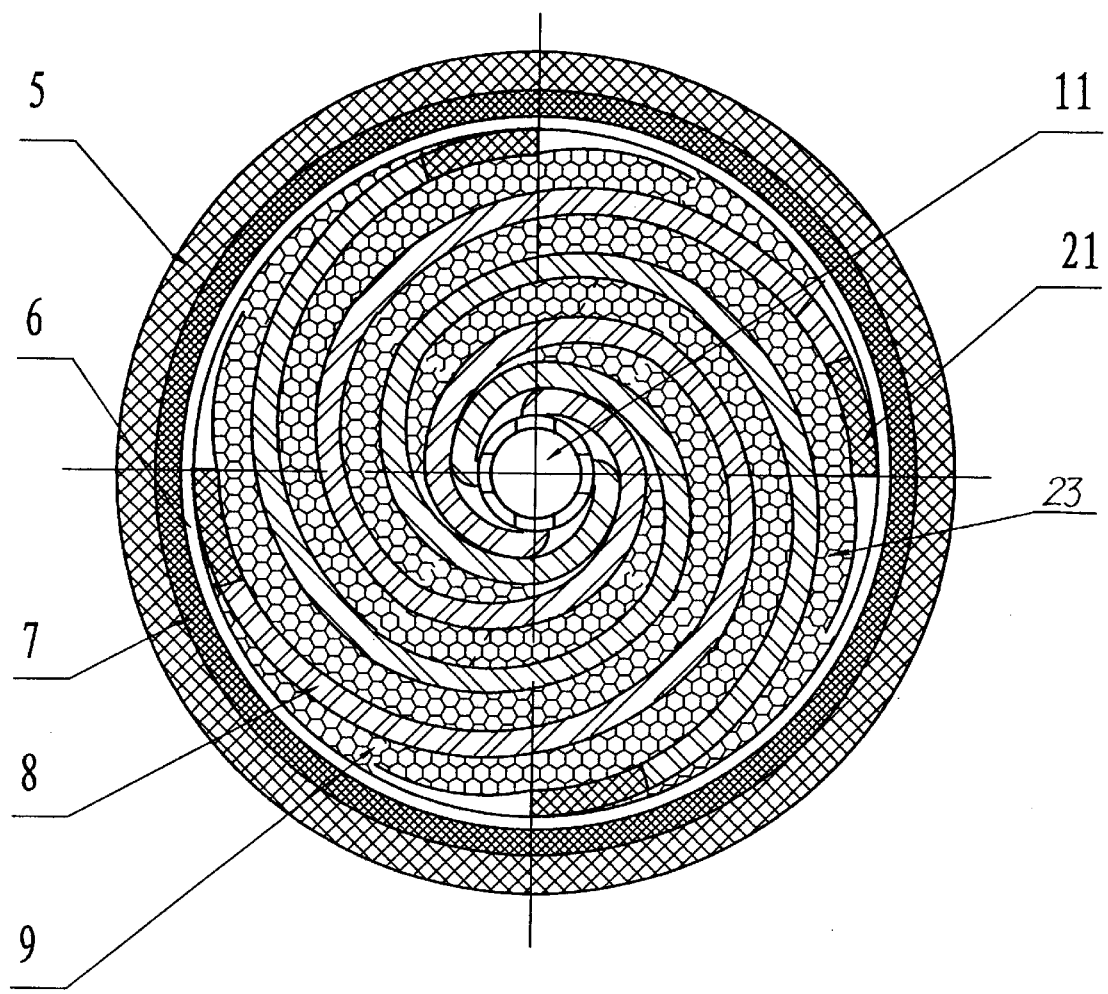
FIG. 2 is a schematic view of the cross-sectional structure of the present invention.
Figure 3:
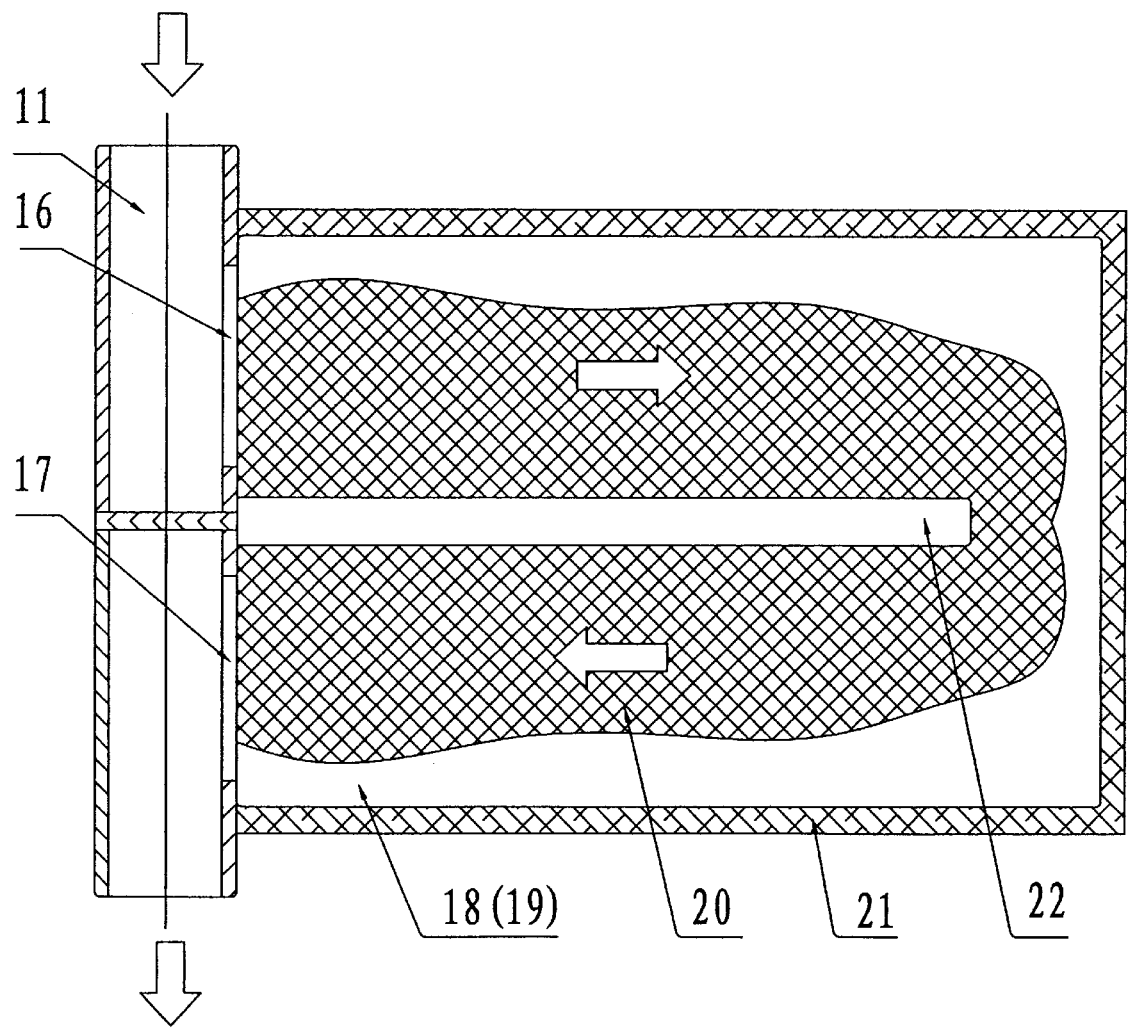
FIG. 3 is a schematic diagram of the structure of the flow unit I of the present invention.

Definition of the drawing's mark number:

1—outlet
2,2'—cover
3—inlet
4—water distributing board
5—outer crust
6—conductive crust
7—insulated filler
8—flow unit I
9—flow unit II
10—anode
11—central pipe
12—water gathering board
13—outlet
14—cathode
15—inlet
16—water distributing aperture
17—water gathering aperture
18—anion exchange membrane
19—cation exchange membrane
20—insulated net-separating wall
21—sealing edge
22—guide band Referring to FIG. 1, FIG. 2 and FIG. 3, the central pipe 11 is a metal pipe, for distributing and gathering water. It is blocked in the middle. The upper half part is water gathering pipe, in which side wall, water gathering aperture 17 is slotted. The lower half part is water distributing pipe, in which side wall, water distributing aperture 16 is slotted. Each set of water distributing and gathering apertures are slotted on the same axial line;

The flow unit I 8 is an U-shape flow passage in a membrane bag structure (shown in FIG. 3): an anion exchange membrane 18 and a cation exchange membrane 19 build up a membrane bag. Three sides of said anion exchange membrane 18 and cation exchange membrane 19 are sealed by sealing edge 21, the other side is opening. An insulated net-separating wall 20 is in the membrane bag, namely between of said anion exchange membrane 18 and cation exchange membrane 19. A guide band 22 is positioned on the middle of said insulated net-separating wall 20 and kept fitting closely to the inner wall of the membrane bag to form the U-shape flow passage.

The opening side of the membrane bag fits tightly to the central pipe 11 along the axial direction, meanwhile the two terminal of the U-shape flow passage is linked up with water distributing aperture 16 and water gathering aperture 17, respectively.

One or more membrane bags are rolled up to form a cylinder structure which centers on central pipe 11 as the helical axis, according to the requirement of the product capacity. FIG. 2 shows a cylinder structure formed by four membrane bags. A conductive crust 6 is composed of metal strip or metal wire twined round the outside of said main component parts. The conductive crust 6 is used as an electrode. Ion exchange resin is filled up between the adjacent membrane bags in the conductive crust 6 to form flow unit II 9.

The assembly metioned above includes the main component parts of the present invention.

The main component parts are assembled in outer crust 5 with shell covers 2 at two terminals, outlet 1 and feed water inlet 3 are positioned at cover 2, inlet 15 and outlet 13 are positioned at the other cover 2', anode 10 and cathode 14 which are linked up with conductive crust 6 and central pipe 11 respectively are positioned on the outer crust 5.

Insulated filler 7 is lined between outer crust 5 and conductive crust 6.

Water distributing board 4 and water gathering board 12 are lined between the shell covers 2,2' and the cylinder structure; namely to construct the whole present invention.

In operation, pretreated water influx via the feed water inlet 3, through the flow unit II 9, and de-ionized water efflux through the outlet 13, that's the product water; concentrated water can be circulated, entering the apparatus from the inlet 15, passing through the flow unit I 8, and outgoing through the outlet 1.

To renew the ion exchange resin, remove the covers 2 and 2', water distributing board 4 and water gathering board 12, feed water in the inlet 3 to thrust the ion exchange resin; then fill the new ion exchange resin. there is no special requirement for the ion exchange resin, even the general particle-type ion exchange resin.

According to the specification of the fed water, one apparatus of this invention can produce 1~2 T namely 1000~2000 liters high purity water per hour, while deionization ratio at 95%~99%, power 0.3~1.0 kw/h/T and utilization ratio of water 90%~95%. For example, if the conductivity of fed water is 10 $\mu$s/cm, we can get the product water 1500 liters per hour and its conductivity is only 0.1 $\mu$s/cm. (see Table 1)

TABLE 1

| Feed water | Product water | Output capacity | Power | Utilization ratio of water |
| --- | --- | --- | --- | --- |
| 10 $\mu$s/cm | 0.1 $\mu$s/cm | 1500 L/h | 0.8 kw/h | >95% |

Said apparatus of this invention is suitable to process the pretreated water, such as the conductivity of water being lower than 500 $\mu$s/cm, especially lower than 100 $\mu$s/cm.

Said apparatus of this invention has exchangeability, namely you can change the fed water inlet for the product water outlet to meet your needs.

Said apparatus of this invention can be used in series, one stage or multi-stage.

Figure 4:
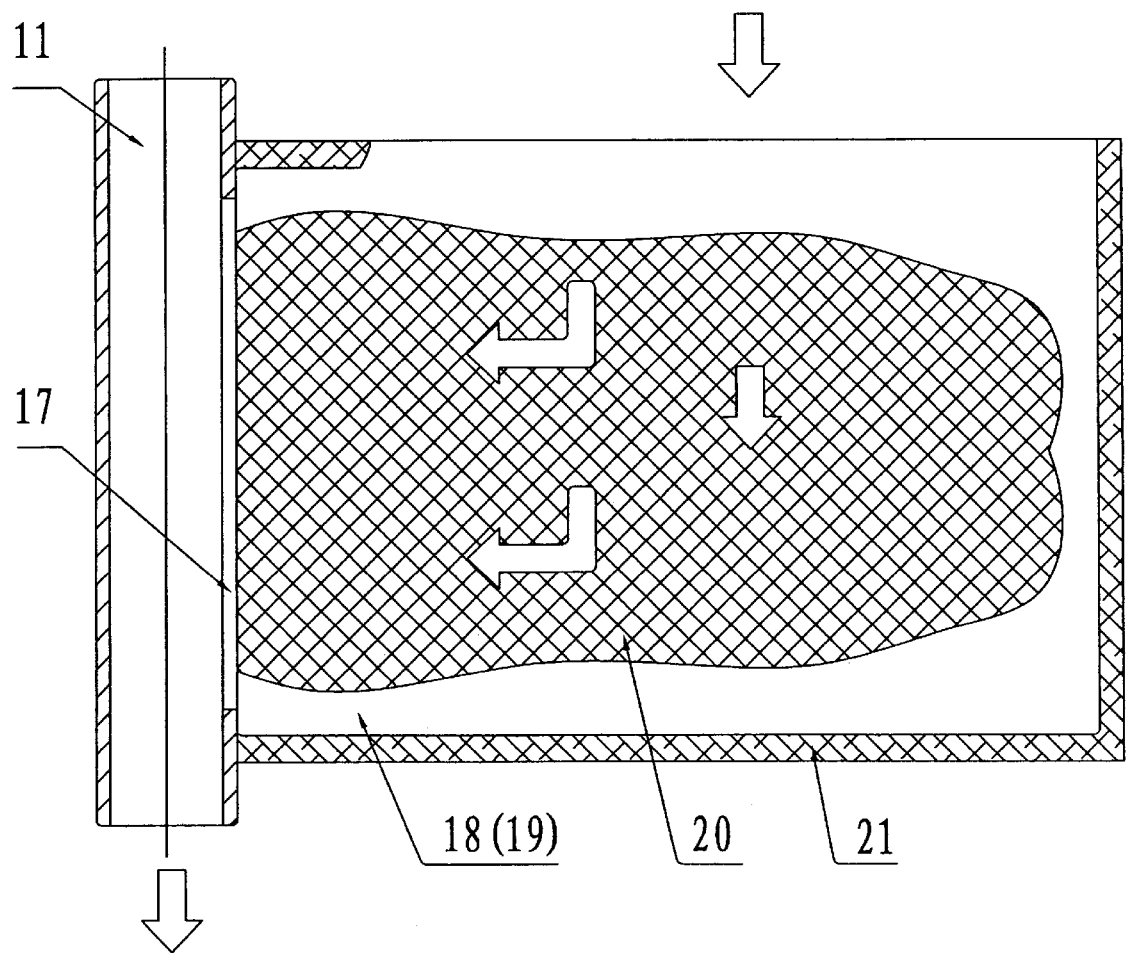
FIG. 4 is a schematic diagram of another different structure of the flow unit I of the present invention.

FIG. 4 presents another different structure of the flow unit I of the present invention. The flow unit I 8 may also be designed to become another structure: an anion exchange membrane 18 and a cation exchange membrane 19 build up a membrane bag. An insulated net-separating wall 20 is in the membrane bag, namely between of said anion exchange membrane 18 and cation exchange membrane 19. Two sides of said anion exchange membrane 18 and cation exchange membrane 19 are sealed by sealing edge 21; the third side is opening, whole or partial, as the entrance of concentrated water; the last side of the membrane bag fits tightly to the central pipe 11 along the axial direction, so that the flow unit I linked with water gathering aperture 17.

Feed water enters the membrane bag through the opening side directly as the same time as through the ion exchange resin, then the water through the membrane bag flows into the central pipe 11 via water gathering aperture 17, and exits; the others pass through the ion exchange resin to be the product water. Therefore, only one feed water inlet is needed to be positioned at one cover of the outer crust 5. Product water outlet and concentrated water outlet are positioned at the other cover of the outer crust 5. The remaining structure is the same as mentioned above. Thus the structure is much simpler, but concentrated water cannot be used in circulation.

In short, we can find these advantages of the present invention as the following:

i. The structure of the present invention is more simpler, water flows smoothly in each flow unit and meets with less pressure drop and needs less power, in particular, it is suited to multiple-device series operation;

ii. It is not necessary to use expensive woven-type special ion exchange resin, but a general particle-type ion exchange resin can be used, and so production cost is lower;

iii. Besides, daily maintenance and renewal of the resin is also more convenient than the prior art.

The present invention has been described in considerable detail with reference to certain preferred versions thereof, however other versions are possible. Therefore the spirit and scope of the appended claims should not be limited to the description of the preferred versions contained herein.

We claim:

1. A helical electrodeionization apparatus which comprises an anion exchange membrane (18) and a cation exchange membrane (19), a central pipe (11), a plurality of main component parts, an outer crust (5) and covers(2,2'), wherein:

said central pipe (11) is metal pipe that acts as an electrode and also as water distributing or gathering pipe;

said main component parts of said apparatus, which have a helical cylinder structure with said central pipe (11) as the helical axis, further comprising:

i. at least one set of rolled membrane bags that are formed by positioning a net-separating wall (20) between an anion exchange membrane (18) and a cation exchange membrane (19), ii. metal strip or metal wire twined round the outside of said cylinder structure which forms a conductive crust, said conductive crust being used as another electrode;

a first flow unit (8) of said main component parts, including the flow passage in said membrane bag being fitted tightly and communicating with said central pipe (11) along the axial direction; and a second flow unit (9) of said main component parts, including the flow passage between said adjacent membrane bags being formed by filling ion exchange resin.

2. The apparatus of claim 1, wherein said central pipe (11) is blocked in the middle, the upper half part operating as a water gathering pipe which has water gathering aperture (17) slotted in a side wall; the lower half part operating as a water distributing pipe which has water distributing aperture (16) slotted in the side wall; each set of water distributing and gathering aperture (16,17) being slotted on the same axial line.

3. The apparatus of claim 1, wherein said first flow unit (8) has a U-shape flow passage which is comprised of an anion exchange membrane (18) and a cation exchange membrane (19), three sides of said anion exchange membrane (18) and cation exchange membrane (19) sealed by sealing edge (21) to form a membrane bag structure, the other side opening; an insulated net-separating wall (20) being in the membrane bag, between said anion exchange membrane (18) and said cation exchange membrane (19), a guide band (22) positioned on the middle of said insulated net-separating wall (20) and kept fitting closely to the inner wall of said membrane bag to form the U-shape flow passage; the opening side of said membrane bag being fitted tightly to the central pipe (11) along the axial direction, meanwhile the two terminal of the U-shape flow passage linked up with the water distributing aperture (16) and water gathering aperture (17), respectively.

4. The appartus of claim 1, wherein said first flow unit (8) can also be the flow passage in such a membrane bag: two sides of anion exchange membrane (18) and cation exchange membrane (19) sealed by sealing edge, the third side opening, whole or partial, as the entrance of concentrated water, the last side of the membrane bag being fitted tightly to the central pipe (11) along the axial direction and linked with water gathering aperture (17); water entering the membrane bag through the opening side directly, flowing into the central pipe (11) via water gathering aperture (17), and exiting.

5. The apparatus of claim 1, wherein the conductive crust (6) is wound with metal strip or metal wire.

* * * * *

UNITED STATES PATENT AND TRADEMARK OFFICE
CERTIFICATE OF CORRECTION

PATENT NO. : 6,190,528 B1
DATED : February 20, 2001
INVENTOR(S) : Li et al.

Page 1 of 1

It is certified that error appears in the above-identified patent and that said Letters Patent is hereby corrected as shown below:

Column 1,
Line 8, "eletrodeionization" should be -- electrodeionization --.
Line 18, "we" should be -- We --.
Line 36, after "in" insert -- the --.

Column 2,
Line 4, and 5, "so that the" should be -- said --.
Line 6, "said" should be -- so that the --.
Line 12, "more" should be -- much --.
Line 22, "the of general" should be -- the general --.

Column 3,
Line 56, "there" should be -- There --.

Column 4,
Line 42, "more" should be -- much --.
Line 63, "is metal" should be -- is a metal --.
Line 64, "as water" should be -- as a water --.

Signed and Sealed this

Eleventh Day of December, 2001

*Attest:*

Nicholas P. Godici

NICHOLAS P. GODICI
*Attesting Officer*    *Acting Director of the United States Patent and Trademark Office*